May 28, 1935.  C. LONGOBARDI  2,002,957
EXPLOSION AND COMBUSTION MOTOR
Filed March 30, 1933   2 Sheets-Sheet 1
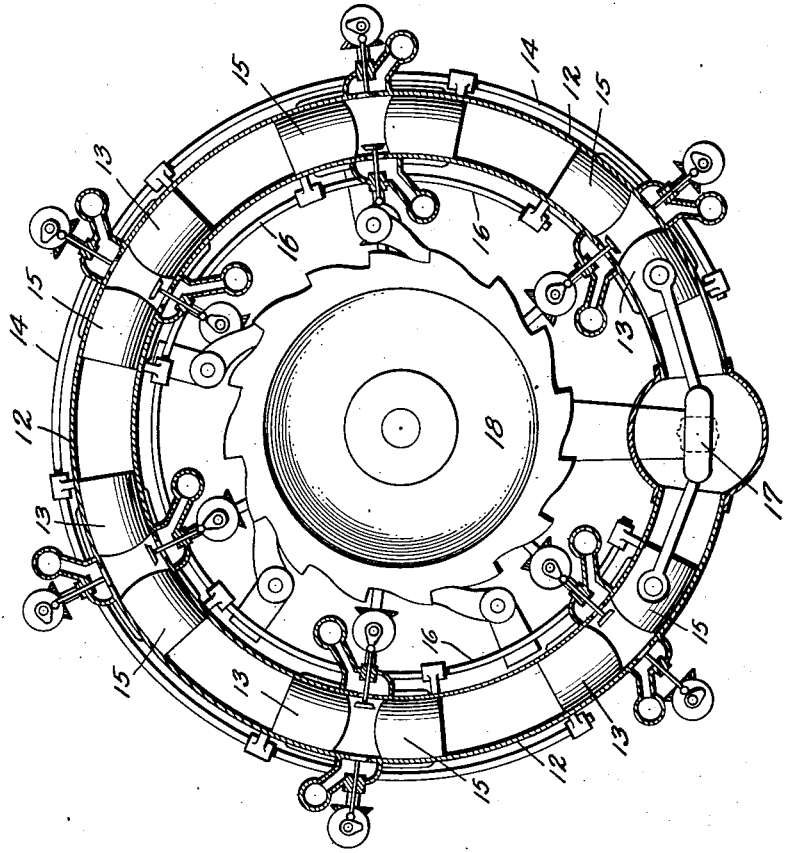
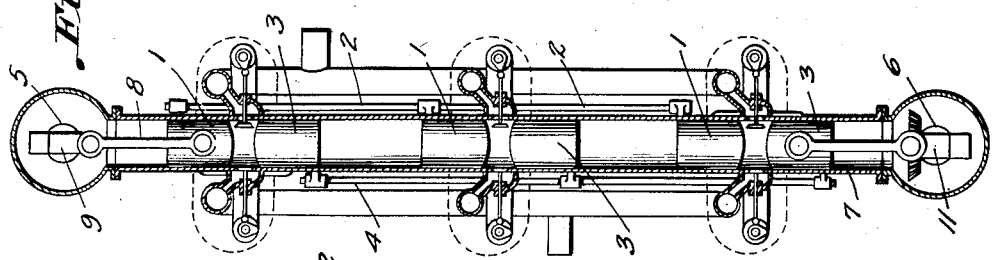
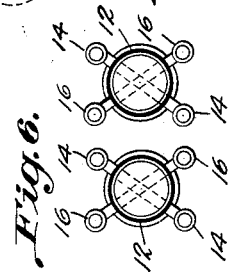
Inventor.
C. Longobardi May 28, 1935. C. LONGOBARDI 2,002,957
EXPLOSION AND COMBUSTION MOTOR
Filed March 30, 1933 2 Sheets-Sheet 2
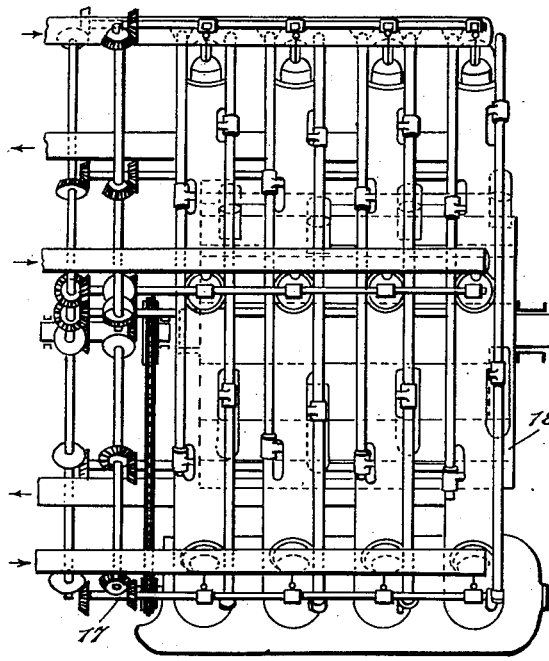
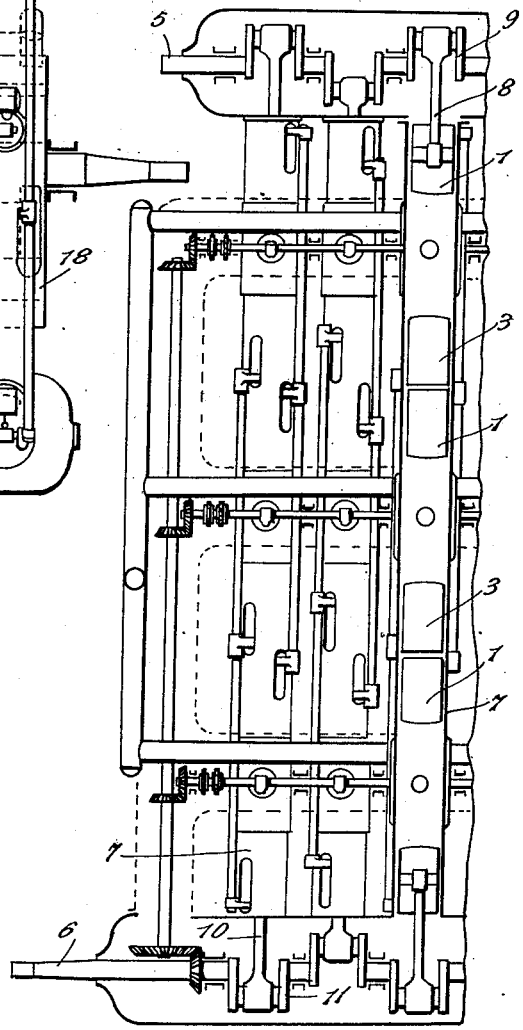
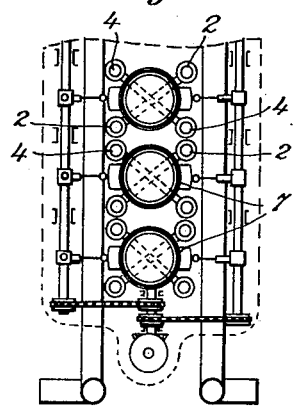

Patented May 28, 1935

2,002,957

UNITED STATES PATENT OFFICE 2,002,957

EXPLOSION AND COMBUSTION MOTOR

Cesare Longobardi, Rome, Italy

Application March 30, 1933, Serial No. 663,612
In Italy April 6, 1932

3 Claims. (Cl. 123—51)

The object of this invention is to so construct a motor that the whole charge is divided to act in a very great number of elementary cylinders without increasing in proportion the necessary mechanical organs and which comprises a number of "thermic" or "kinematic unities."

The realization of the thermic or kinematic unity may take place in two fundamental ways.

According to the first the unity comprises a cylindrical casing with a rectilineal axis and pistons running within. The connecting bars solid or tubular or with any suitable profile have also a rectilineal axis and move reciprocally in a rectilineal direction, this movement being transmitted to two crank-shafts applied to the end of the casing by means of connecting rods, which may be arranged within the cylindrical casing on the corresponding piston pin as normally used in explosion and combustion motors, or outside the cylindrical casing by convenient mechanical connections with the coupling bars. The crank-shafts may be eventually reduced to only one with convenient auxiliary transmission gearings.

Should the transmissions with connecting rod and crank-shaft not be wanted they might be substituted by a rack transmission and tooth wheels conveniently adapted.

According to the second fundamental system of realization the thermic or kinematic unity comprises a torus or polygonal shaped casing. Within this casing there are running the pistons conveniently profiled and connected with the usual system of coupling bars which in this case have a circular axis or eventually they are polygonal shaped. In the case of casings with a polygonal axis the pistons are conveniently connected to the piston pins.

The transmission of motion may take place according to two fundamental manners, namely, either by means of one or more crank shafts interposed between two corresponding pistons or arranged outside the casing and connected to the coupling bars by means of one or more connecting rods or by means of a hook system or free wheel device or special gear wheels of a convenient type connecting the coupling bars to a middle shaft or drum or wheel system concentric with the casing. A crank-shaft inserted between two corresponding pistons or outside the casing and connected to the coupling bars by means of connecting rods could insure the movement of the piston and eventually control the services of distribution ignition and the like. In this case the reduction of the driving shaft is realized at the same time.

The invention will be understood from the following description and the accompanying drawings which however give only an idea by way of an illustrative but not limitative example of the invention when applied to single acting thermic or kinematic unities. The modifications to be introduced in the case of double acting complexes with pistons working on both surfaces are evident.

Fig. 1 is a diagrammatic longitudinal section of a four stroke explosion motor according to the invention, Fig. 2 is a similar cross section, Fig. 3 is a plan view of the same, Fig. 4 is a diagrammatic longitudinal section of another form of the invention, Fig. 5 is an elevation of the same and Fig. 6 is a cross-sectional view of two of the units shown in Fig. 4.

In the form shown in Figs. 1 and 2 a plurality of pistons are mounted in the casing. Each casing has slots through which extend piston pins, said pins being integral with said pistons and connected to the coupling bars. The pistons 1 moving in the same sense are connected by the couples 2 of coupling bars and the pistons 3 moving in the other sense are connected by the couples of bars 4, the transmission of movement taking place by means of two crank-shafts 5 and 6 applied at the end of casings 7 and connected to the contiguous pistons (1 respectively 3) by means of the usual system connecting-rod and crank-shaft (8—9 and 10—11).

Figs. 4, 5 and 6 illustrate the invention as embodied in a four stroke explosion motor with torus shaped casings and single acting thermic unities. A plurality of pistons 13 are mounted in the torus-shaped casing 12, which casing has slots through which extend piston pins, said pins being integral with said pistons and connected to the coupling bars. The pistons 13 moving in the same sense are connected by the couples of bars 14 and the pistons 15 moving in the other sense are connected by the couples of bars 16 the two systems of pistons being connected by crank-shaft 17 and the transmission of movement taking place by means of the central drum 18 and a convenient hook or free wheel system.

As it clearly appears from the specification the invention does not restrain at all the functioning thermic cycle, the invention can therefore be applied as well to a 2—4—6 stroke explosion motor as to a combustion motor of any type whatever for liquid fuels (benzin, benzol, heavy oils and the like) as well as for gaseous fuels.

The invention may be equally applied to fixed or moveable plants particularly for controlling motor-vehicles, air craft and naval constructions.

In the special case of air craft the motor with torus-shaped or polygonal casings has remarkable advantages of compactness and in the type with transmission by means of the central drum the advantage is obtained of the demultiplication of the screw-shaft. The type with a casing with a rectilineal axis has the advantage of being arranged within the wing thickness, the load being thus distributed on a large surface and the concentrated load being consequently reduced. The motor owing to its shape and mechanical resistance may contribute either alone or together with a wing frame to the mechanical resistance of the wing thus the material used in the plant and the weight being more efficiently utilized.

Having now particularly described and ascertained the nature of my said invention and in what manner the same is to be performed, I declare that what I claim is:

1. A combustion motor comprising open-ended casings having slots through the casings and extending longitudinally thereof, a series of pistons within each casing, successive couples of said pistons forming with the walls of the casing a combustion chamber between the members of the couple, the corresponding pistons of each couple having the same motion, and the two pistons of each couple having opposite motion, pins integral with the pistons projecting from each casing through said slots, coupling bars attached to the pins of corresponding pistons having the same motion.

2. A combustion motor as claimed in claim 1 wherein the ignition takes place in each of the combustion chambers of one casing simultaneously.

3. A combustion motor as claimed in claim 1 wherein the ignition takes place in each of the combustion chambers of one casing in succession.

CESARE LONGOBARDI.